United States Patent
Lea et al.

(10) Patent No.: US 7,898,957 B2
(45) Date of Patent: Mar. 1, 2011

(54) NON-BLOCKING DESTINATION-BASED ROUTING NETWORKS

(75) Inventors: Chin-Tau Lea, Ma On Shan (HK); Jian Chu, Ma On Shan (HK)

(73) Assignee: The Hong Kong University of Science and Technology, Kowloon (HK)

( * ) Notice: Subject to any disclaimer, the term of this patent is extended or adjusted under 35 U.S.C. 154(b) by 922 days.

(21) Appl. No.: 11/556,165

(22) Filed: Nov. 2, 2006

(65) Prior Publication Data

US 2007/0076615 A1  Apr. 5, 2007

Related U.S. Application Data

(63) Continuation-in-part of application No. 11/243,117, filed on Oct. 3, 2005.

(60) Provisional application No. 60/748,282, filed on Dec. 8, 2005.

(51) Int. Cl.
*G01R 31/08* (2006.01)
*G06F 11/00* (2006.01)
*H04L 12/26* (2006.01)

(52) U.S. Cl. .................................. 370/235; 370/252

(58) Field of Classification Search .................. 370/238, 370/254
See application file for complete search history.

(56) References Cited

U.S. PATENT DOCUMENTS

| | | | | |
|---|---|---|---|---|
| 4,967,345 A | * | 10/1990 | Clarke et al. | 709/241 |
| 5,909,440 A | | 6/1999 | Ferguson et al. | |
| 6,804,199 B1 | | 10/2004 | Kelly et al. | |
| 7,366,108 B2 | * | 4/2008 | Szentesi et al. | 370/254 |
| 2002/0103631 A1 | * | 8/2002 | Feldmann et al. | 703/22 |
| 2002/0143929 A1 | | 10/2002 | Maltz et al. | |
| 2003/0068975 A1 | | 4/2003 | Qiao et al. | |
| 2003/0072267 A1 | | 4/2003 | Lohtia et al. | |
| 2003/0072327 A1 | | 4/2003 | Fodor et al. | |
| 2003/0118024 A1 | | 6/2003 | Lee et al. | |
| 2003/0118027 A1 | | 6/2003 | Lee et al. | |
| 2003/0161268 A1 | | 8/2003 | Larsson et al. | |
| 2003/0174688 A1 | | 9/2003 | Ahmed et al. | |
| 2003/0185209 A1 | | 10/2003 | Lee | |
| 2003/0198235 A1 | | 10/2003 | Weldon et al. | |
| 2003/0202465 A1 | | 10/2003 | Cain | |
| 2003/0202468 A1 | | 10/2003 | Cain et al. | |
| 2003/0202469 A1 | | 10/2003 | Cain | |

(Continued)

OTHER PUBLICATIONS

R. Braden et al., "Integrated Services in the Internet Architecture: An Overview," RCF 1633, Jun. 1994.

(Continued)

*Primary Examiner* — Derrick W Ferris
*Assistant Examiner* — Angel Brockman
(74) *Attorney, Agent, or Firm* — Turocy & Watson, LLP

(57) ABSTRACT

A route computation algorithm, a load-balancing scheme inside a router for making a hop-by-hop routing network (such as the Internet) nonblocking are described in this patent. The output of the route computation algorithm includes a set of link weights that determine the paths of the hop-by-hop routing network. The route computation algorithm and the load-balancing scheme also determine the ingress and egress traffic constraints at each edge router such that as long as the traffic entering and leaving the network does not exceed the constraints, none of the internal links will ever have traversing traffic more than its link capacity. The network is thus nonblocking internally. This greatly simplifies flow admission control and allows hard QoS to be supported inside the network.

7 Claims, 5 Drawing Sheets

U.S. PATENT DOCUMENTS

| | | | |
|---|---|---|---|
| 2003/0202476 | A1 | 10/2003 | Billhartz et al. |
| 2003/0204587 | A1 | 10/2003 | Billhartz |
| 2003/0204616 | A1 | 10/2003 | Billhartz et al. |
| 2003/0204619 | A1 | 10/2003 | Bays |
| 2003/0204623 | A1 | 10/2003 | Cain |
| 2003/0204625 | A1 | 10/2003 | Cain |
| 2003/0227877 | A1* | 12/2003 | Kar et al. ............ 370/252 |
| 2003/0229613 | A1 | 12/2003 | Zargham et al. |
| 2004/0022203 | A1 | 2/2004 | Michelson et al. |
| 2004/0022223 | A1 | 2/2004 | Billhartz |
| 2004/0022224 | A1 | 2/2004 | Billhartz |
| 2004/0029553 | A1 | 2/2004 | Cain |
| 2004/0037294 | A1 | 2/2004 | Yamaguchi et al. |
| 2004/0042404 | A1 | 3/2004 | Ravindran et al. |
| 2004/0042473 | A1 | 3/2004 | Park et al. |
| 2004/0057724 | A1 | 3/2004 | Oksanen et al. |
| 2004/0067754 | A1 | 4/2004 | Gao et al. |
| 2004/0071089 | A1 | 4/2004 | Bauer et al. |
| 2004/0071468 | A1 | 4/2004 | Doh et al. |
| 2004/0073701 | A1 | 4/2004 | Huang et al. |
| 2004/0081197 | A1 | 4/2004 | Liu |
| 2004/0114569 | A1 | 6/2004 | Naden et al. |
| 2004/0136324 | A1 | 7/2004 | Steinberg et al. |
| 2004/0143842 | A1 | 7/2004 | Joshi |
| 2004/0184483 | A1 | 9/2004 | Okamura et al. |
| 2004/0190526 | A1 | 9/2004 | Kumar et al. |
| 2004/0192204 | A1 | 9/2004 | Periyalwar et al. |
| 2004/0196787 | A1 | 10/2004 | Wang et al. |
| 2004/0196860 | A1* | 10/2004 | Gao et al. ............ 370/437 |
| 2004/0203820 | A1 | 10/2004 | Billhartz |
| 2004/0213172 | A1 | 10/2004 | Myers et al. |
| 2004/0213198 | A1 | 10/2004 | Mahmood et al. |
| 2004/0213255 | A1 | 10/2004 | Brinkerhoff et al. |
| 2004/0214576 | A1 | 10/2004 | Myers et al. |
| 2004/0215817 | A1 | 10/2004 | Qing et al. |
| 2004/0221154 | A1 | 11/2004 | Aggarwal |
| 2004/0228304 | A1 | 11/2004 | Riedel et al. |
| 2004/0228323 | A1 | 11/2004 | Acharya et al. |
| 2004/0233850 | A1 | 11/2004 | Randriamasy et al. |
| 2004/0233907 | A1 | 11/2004 | Hundscheidt |
| 2004/0246900 | A1 | 12/2004 | Zhang et al. |
| 2004/0246901 | A1 | 12/2004 | Zhang et al. |
| 2004/0264372 | A1 | 12/2004 | Huang |
| 2004/0264466 | A1 | 12/2004 | Huang |
| 2005/0114541 | A1 | 5/2005 | Ghetie et al. |
| 2005/0265258 | A1* | 12/2005 | Kodialam et al. ............ 370/254 |
| 2007/0115814 | A1 | 5/2007 | Gerla et al. |

OTHER PUBLICATIONS

R. Callon, "Use of OSI IS-IS for Routing in TCP/IP and Dual Environments," RFC 1995, Dec. 1990.

Cisco, Configuring OSPF, 1997.

CPLEX, ILOG CPLEX Division, http: www.cplex.com.

B. Fortz at al, "Optimizing OSPF/IS-IS Weights in a Changing World," IEEE JSAC Special Issue on Advances in Fundamentals of Network Management, Spring 2002.

K. Holmberg et al., "Optimization of Internet Protocol Network Design and Routing," Networks, 2004, pp. 39-53, vol. 43.

J. Moy, "OSPF Version 2," RFC 2328, Apr. 1998.

M. Pioro et al., "On OSPF Related Network Optimization Problems," Performance Evaluation, 2002, pp. 201-223, vol. 248.

A. Sridharan at al., "Achieving Near-Optimal Traffic Engineering Solutions for Current OSPF/IS-IS Networks," INFOCOM, 2003.

Y. Wang at al., "Internet Traffic Engineering without Full Mesh Overlaying," INFOCOM, 2001.

C. Zhang et al., "On Optimal Routing with Multiple Traffic Matrices," IEEE INFOCOM, Mar. 2005.

Johnson et al., "Optimization by Simulated Annealing: An Experimental Evaluation: Part I, Graph Partitioning", Operations Research, vol. 37, No. 6, Nov.-Dec. 1989.

Johnson et al., "Optimization by Simulated Annealing: An Experimental Evaluation: Part II, Graph Coloring and Number Partitioning", Operations Research, vol. 39, No. 3, May-Jun. 1991.

Apostolopoulos, et al. QoS Routing Mechanism and OSPF Extensions RCF 2676, Network Working Group, Aug. 1999.

Fortz, et al. Internet Traffic Engineering by Optimizing OSPF Weights. Proc. IEEE INFOCOM, Mar. 2000.

Kodialam, et al. "A Simple Traffic Independent Scheme for Enabling Restoration Oblivious Routing of Resilient Connections," IEEE INFOCOM, 2004.

Rosen, et al. "Multiprotocol, Label Switching Architecture," RCF 3031, Network Working Group, Jan. 2001.

Applegate, et al. "Making Intra-Domain Routing Robust to Changing and Uncertain Traffic Demands: Understanding Fundamental Tradeoffs," Proc.ACM, 2003.

Blake, et al. "An Architecture for Differentiated Services," RFC 2475, Dec. 1998.

Cetinkaya, et al. "Egress Admission Control," Proc. IEEE INFOCOM, Mar. 2000.

Chu, et al. "Maximizing EF-Class Traffic in DiffServ Networks," To be published.

Duffield, et al. "A Flexible Model for Resource Management in Virtual Private Networks," In ACM SIGGCOM, San Diego, California, USA, Aug. 1999.

Erlebach, et al. "Optimal Bandwidth Reservation in Hose-Model VPNs with Multi-Path Routing." IEEE INFOCOM 2004.

Giordano, et al. "Advanced QoS Provisioning in IP Networks: The European Premium IP Projects," IEEE Communication Magazine, Jan. 2003.

Gupta, et al. "Provisioning a Virtual Private Network : A Network Design Problem for Multicommodity Flow," Proc. ACM 2001.

Ivars, et al. "PBAC: Probe-Based Admission Control," Proc. QoFIS 2001, pp. 97-109.

J. Chu, et al. "Fast Algorithms for Hose-Model VPNs Construction," to be published.

Leu, et al. "Label Aggregation Technique for LDP," Internet draft, IETF, Jul. 2000. www.draft-leu-mpls-ldp-label-aggregation-00.txt.

Chu, et al. "Routing and Restoration in Networks with Hose-Model Traffic Patterns," to be published.

Juttner, et al. "On Bandwidth Efficiency of the Hose Resource Management Model in Virtual Private Networks," In IEEE INFOCOM, San Francisco, Apr. 2003.

Knightly, et al. "Admission Control for Statistical QoS : Theory and Practice," IEEE Network, vol. 13, No. 2, Mar. 1999, pp. 20-29.

Kumar, et al. "Algorithms for Provisioning Virtual Private Networks in the Hose Model," ACM SIGCOMM, Cambridge Massachusetts, USA, Aug. 2001.

Rosen, et al. BGP/MPLSVPNs, memo, Mar. 1999.

Zhang, et al. "Decoupling QoS Control from Core Routers: A Novel Bandwidth Broker Architecture for Scalable Support of Guaranteed Services," Proc. ACM SIFCOMM Aug./Sep. 2000.

OA mailed Mar. 20, 2009 for U.S. Appl. No. 11/243,117, 20 pages.

OA mailed Aug. 20, 2008 for U.S. Appl. No. 11/243,117, 21 pages.

* cited by examiner

NON-BLOCKING DESTINATION-BASED ROUTING NETWORKS

CROSS-REFERENCE TO RELATED APPLICATIONS

This application claims the benefit of priority from previously filed provisional application entitled "Non-Blocking Destination-Based Routing Networks," filed on Dec. 8, 2005, with Ser. No. 60/748,282, and the entire disclosure of which is herein incorporated by reference.

This application is a continuation-in-part application of U.S. application entitled "Non-Blocking Internet Backbone Network," filed on Oct. 3, 2005, with Ser. No. 11/243,117, and the entire disclosure of which is herein incorporated by reference.

BACKGROUND

1. Field of the Invention

This invention relates to techniques for maintaining the hard quality of service (QoS) of the developing Internet. In particular, it relates to a method and system for controlling the admissible ingress and egress traffic of edge routers of the Internet and for balancing loads among equal-distance shortest paths for achieving a non-blocking Internet.

2. Description of Related Art

Internet Protocol (IP) networks are traditionally designed to support a best-effort service, with no guarantees on the reliability and the timely delivery of the packets. In interconnected packet networks, such as the Internet, users establish a connection between a source and a destination with a stream of data packet transferred through the network over a network path. The network path is defined by a set of nodes interconnected by a set of links through which packets of the connection are transferred. The network path can be generated by a variety of algorithms, such as the Dijkstra's shortest path algorithm or the like. Packet networks may have a hierarchical structure in which smaller networks are interconnected by larger networks. A packet network connects to one or more other packet networks through ingress and egress points (routers) of the network.

Interior routing protocols are employed by network routers to determine a path through the internal routers of the network along which packets between the ingress and the egress routers are forwarded. Packets received by a router are forwarded to other routers of the network based on a forwarding table constructed in accordance with the interior routing protocol, but may also be forwarded through routes installed with explicit route provisioning. Interior routing protocols may also specify network topology, link capacity/usage, and link-state information ("network information") that is exchanged between the network routers. Network information allows the routers to construct the corresponding forwarding table. Examples of widely used interior routing protocols, and most relevant to this invention, are the Open Shortest Path First (OSPF) and IS-IS protocols. Common routing protocols such as OSPF and IS-IS choose least-cost paths using link weights, so inferred weights provide a simple, concise, and useful model of intra-domain routing. In this model, every link is labeled with a number called the weight or cost; conventionally this link weight may be a function of delay time, average traffic, and sometimes simply the number of hops between nodes.

As IP networks mature and are increasingly being used to support real-time applications, such as voice onto IP-based platforms, the existing IP networks need to provide a new level of QoS for such new applications. Differentiated Services (DiffServ) have become the main QoS architecture for the Internet. DiffServ avoids per-flow bandwidth reservation inside the network. It classifies flows into aggregates (classes), and provides appropriate QoS for the aggregates. A small bit-pattern in each packet—the ToS octet of IPv4 or the Traffic Class octet of IPv6—is used to mark a packet for receiving a particular forwarding treatment at each network node. A service level agreement (SLA) is signed between a service provider and customers to specify the type of services and the amount of traffic required for each type. An SLA codifies what a provider promises to deliver in terms of what, how, and associated penalties for failures.

QoS requirements of the premium class of traffic need to be achieved with components in both the data-plane and the control-plane. Data-plane components include traffic shaping and policing, traffic classification, scheduling and buffer management. Control-plane components include signaling and flow admission control (FAC) and network provisioning/traffic engineering. Effective implementations of data-plane components are well understood and available; only local state information in a router or switch is required.

In contrast, control-plane components, such as FAC and network dimensioning, remain open issues. When link-state information or link-bandwidth information (e.g., connectivity or available bandwidth) is exchanged between routers, each router in the network has a complete description of the network's topology. The challenges of the control-plane design arise from the fact that the implementations of control-plane components need the state information of the entire network. Typically, there are millions of flows traversing through a high-speed link, and therefore maintaining the state information of all links of the entire network is simply not practical.

There are several proposals for FAC. The general concerns about these proposals include the following.

(a) Scalability and Effectiveness: referring to FIG. 1, the network equipment that performs provisioning, resource management and FAC is called bandwidth broker (BB). BB architecture implies that admission control decisions are made at a central location for each administrative domain, such as ISP A 101 and ISP B 105. Although the cost of handling service requests is significantly reduced, it is unlikely that this approach can be scaled upward for large networks. In order to cope with scalability, most relevant studies adopt distributed admission control schemes, which are further distinguished into model-based and measurement-based approaches. Both approaches assess QoS deterioration probability upon service request arrivals; model-based approaches maintain state information for active services and employ mathematical models, whereas measurement-based approaches rely on either passive or active aggregate measurements. The main concern is the effectiveness of the schemes. The centralized FAC, although not scalable, can provide better QoS than the distributed admission control schemes.

(b) Applicability to Inter-domain QoS: All FAC schemes must fully address the inter-domain QoS issues. It is anticipated that there will be significant variation in the implementations and resource management strategies from one ISP to another. It is unlikely that we will find a unified approach across the Internet. Cascading different QoS approaches will work only if they cooperate with each other, which is difficult to achieve. For example, if one network uses measurement-based FAC and the other uses model-based FAC, it is unlikely that the end-to-end QoS can be achieved as anticipated for a flow path passing through the two networks.

While some QoS capabilities in an isolated environment have been demonstrated, providing end-to-end QoS at a large scale and across domain boundaries remains a challenging and unsolved problem. A need exists for designing a new and practical FAC scheme to maintain the QoS in the future Internet.

In another patent application filed on Oct. 3, 2005 with Ser. No. 11/243,117, commonly assigned to the Hong Kong University of Science & Technology, we proposed the concept of non-blocking networks to solve the QoS problem and simplify the FAC design of an MPLS Internet backbone network. A network is called non-blocking if it can always accommodate a new flow (or a dynamic service-level-agreement) as long as the ingress and the egress nodes or routers have capacity to set up the flow. One major advantage of the invention is that, if a network is non-blocking, its FAC will be greatly simplified as we do not need to check the capacity utilization of all internal links. Those methods described in U.S. patent application Ser. No. 11/243,117 are for MPLS-type networks that use explicit routing. The Internet uses destination-based routing where each node uses the destination of the packet to route the packet. Destination-based routing is also called hop-by-hop routing. Therefore, there is a need for a method, apparatus, and system for designing a non-blocking hop-by-hop backbone network.

SUMMARY

In this patent, we present methods, apparatus, and system to build non-blocking destination-based routing networks, such as the Internet. According to the methods and system of this invention, only the ingress and egress routers need to be verified for accepting a new flow. As demonstrated in FIG. 2, we will assume a new flow from router A 201 to router D 203 needs to be added. If the network is non-blocking, we only need to check if the ingress node or router (i.e., router A 201) and the egress node or router (i.e., router D 203) have the required capacity to accommodate the new flow. The complex task of monitoring the status of each link inside the network, such as links 210, 215, and 220, can be avoided.

Given a network topology and its link capacities, the present invention provides a way to determine the optimal link weights and the resulting paths that can maximize the amount of admissible ingress and egress traffic of the network and still maintain the non-blocking property. As long as the ingress and egress traffic is within this specified amount and the routing follows the determined paths and the associated load-distribution scheme, the traffic load on any internal link will never exceed the link capacity. Thus, the network is non-blocking internally.

Another aspect of this invention includes a blocking mechanism with two thresholds for on-off admission control of each direction. A router has a meter inside. When the total ingress (or egress) traffic exceeds t_high, flow control is turned on and ingress (or egress) flows will be blocked. When the total amount of traffic drops below t_low, flow control will be turned off and ingress (or egress) flows are allowed to enter again. Detecting flows is based on both flow-setup packets and flow-setup ACK packets.

In accordance with another aspect of the invention, a FAC scheme is invented which decides whether a new TCP or UDP flow can be added to the network. The FAC scheme only requires the ingress and egress edge routers to monitor the amount of ingress and egress traffic and there is no need to check the state information of the internal links of the network. The FAC scheme also includes a load-distribution scheme to balance the loads among the equal-distance shortest paths between any two edge routers.

In accordance with still another aspect of the invention, we can set an arbitrary amount as the admissible ingress and egress traffic constraints for each node and compute the capacities of the internal links of the network such that the network is non-blocking. Along with the internal link capacities are the paths for each source-destination pair and the associated load-distribution ratios among these paths.

Further features of the invention, its nature and various advantages will be apparent from the accompanying drawings and the following detailed description of the invention.

BRIEF DESCRIPTION OF THE DRAWINGS

Like reference numbers and designations in the different figures indicate like elements.

DETAILED DESCRIPTION

This invention involves the novel design of a non-blocking network. In this invention, a method and a system for determining traffic constraints, routes, and load-distribution among the equal-distance shortest paths to achieve non-blocking in each router are implemented.

The invention will be illustrated in conjunction with illustrative embodiments of a network and an associated route computation and load-distribution scheme. It should be understood, however, that the invention is not limited to use with the particular network system or node implementation described, but is instead more generally applicable to any route computation algorithm that intends to make network non-blocking.

Figure 3A:
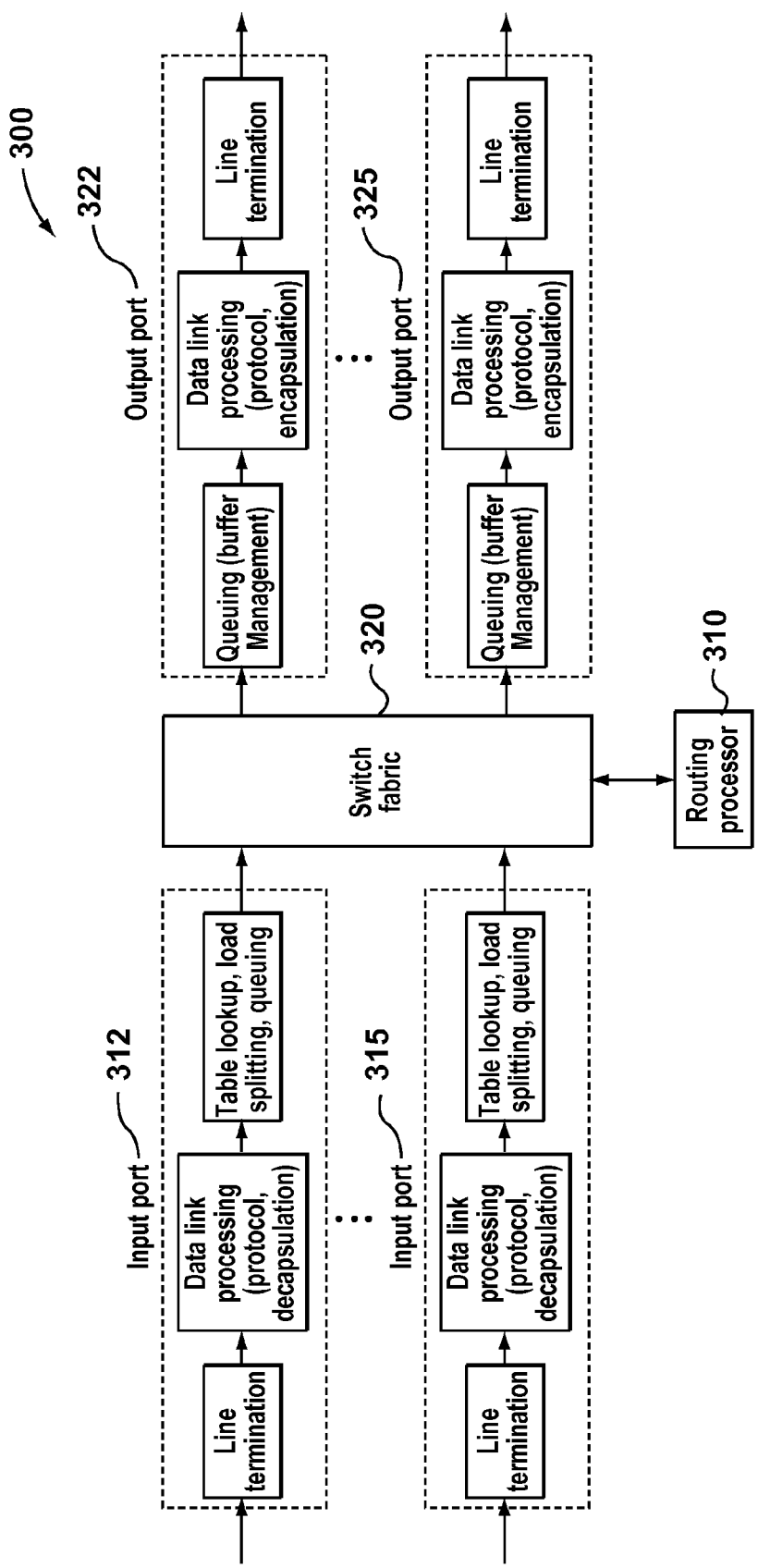
FIG. 3(a) is a schematic representation of router architecture.

FIG. 3(a) is a diagram illustrating a typical router 300 according to one embodiment of the invention. The router 300 includes a routing processor 310, and the switching fabric 320. The switch fabric 320 is an interconnected network of switching devices connecting multiple numbers of input ports, such as input port 312, input 315, etc., and output ports, such as output port 322, output port 325, etc. The switch fabric 320 transports data from the input ports to the output ports.

Figure 3B:
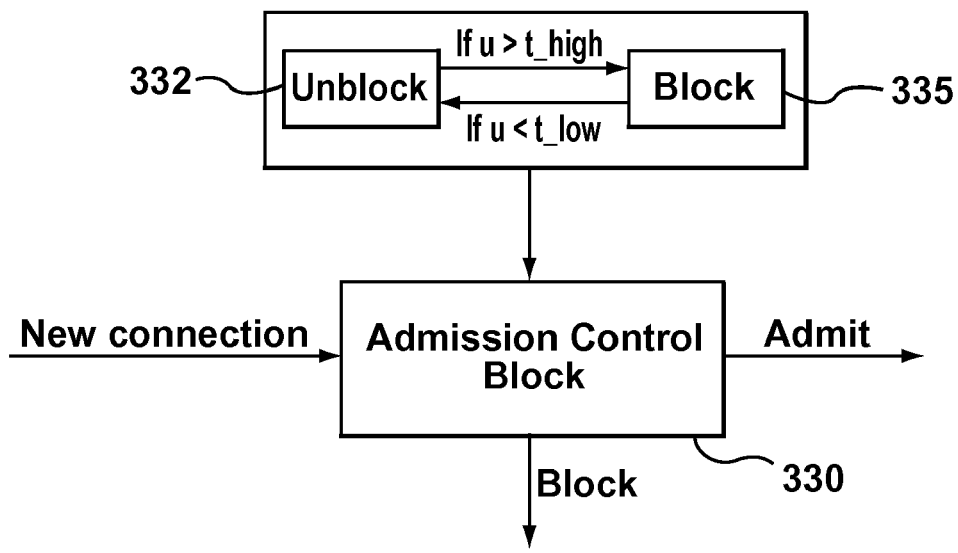
FIG. 3(b) is logical view of the blocking mechanism implemented in a router.

The router 300 may also include a flow blocking mechanism. Referring to FIG. 3(b), there are two thresholds for on-off admission control of each direction. Router 300 has a meter inside, the Admission Control Block 330. When the total ingress or egress traffic exceeds t_high, flow control is turned on and ingress or egress flow setup packets and flow setup acknowledgement packets will be blocked (335). When the total amount of traffic drops below t_low, flow control will be turned off and ingress or egress flow setup packets and flow setup acknowledgement packets are allowed to enter or leave again (332).

Figure 3C:
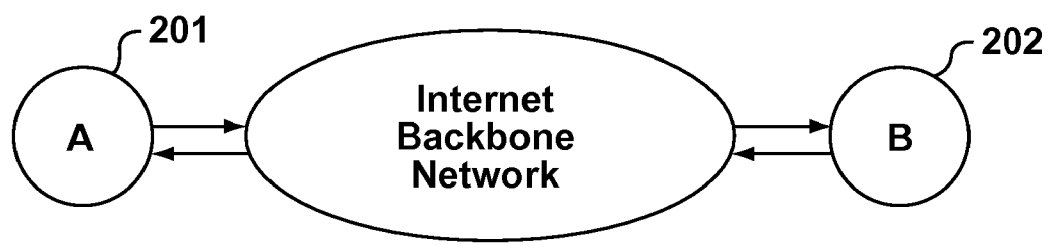
FIG. 3(c) is a diagram of the blocking and unblocking of the setup packets according to the blocking mechanism implemented in a router.

As well known for persons in the art, a flow is a sequence of packets transmitted along a defined route. Flow setup packets and acknowledgement of flow setup packets are distinguished from other data packets of the flow which are transmitted after a flow is set up. Note that detecting flows is based on both flow-setup packets and flow-setup ACK packets. For example, referring to FIG. 3(c), a TCP connection setup packet arrives at edge router A 201, and leaves the network from edge router B 202. This means that the ingress flow control in A and the egress flow control in B have not been turned on. Assume the setup packet reaches the destination host and a TCP flow ACK packet is sent back (SYN=1, ACK=1). This packet will enter the network from edge router B, and leave the network from edge router A. This ACK packet can be blocked by B if B's ingress flow control is turned on. The same discussions apply to session layer flow control packets (like SIP).

Assume a network has n edge routers. The techniques of this invention will produce the following outputs.

The link weights and the resulting routes between any pair of edge routers.

The ingress and egress admissible traffic constraints, denoted by $(\alpha_i, \beta_i)$, $1 \leq i \leq n$, of all edge routers. This determines how much traffic each edge router can inject into or receive from the network without causing overflow on any link.

Figure 1:
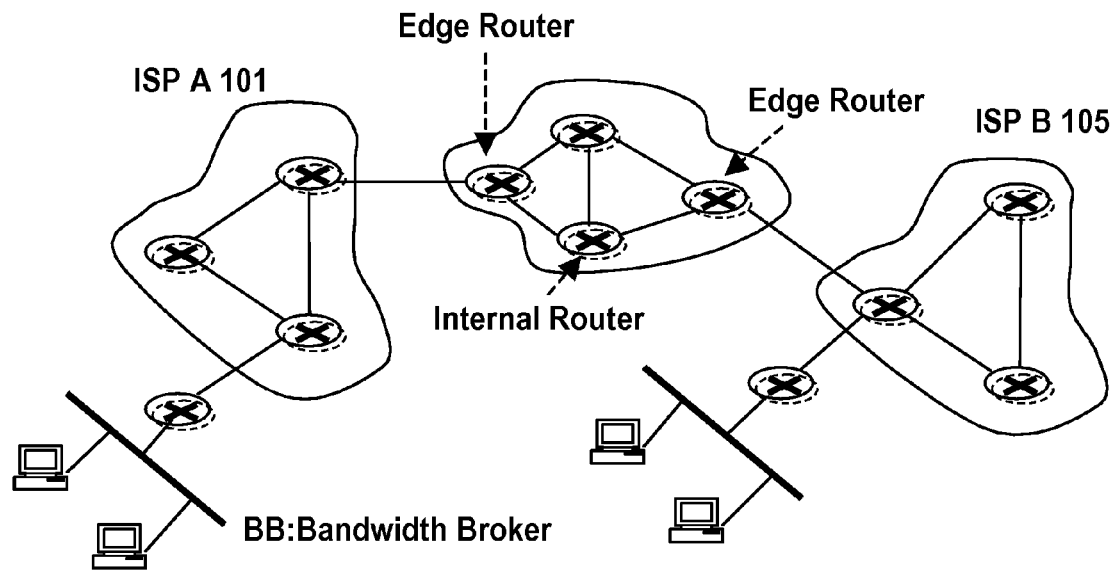
FIG. 1 is a schematic representation of the traditional bandwidth broker infrastructure.
Figure 2:
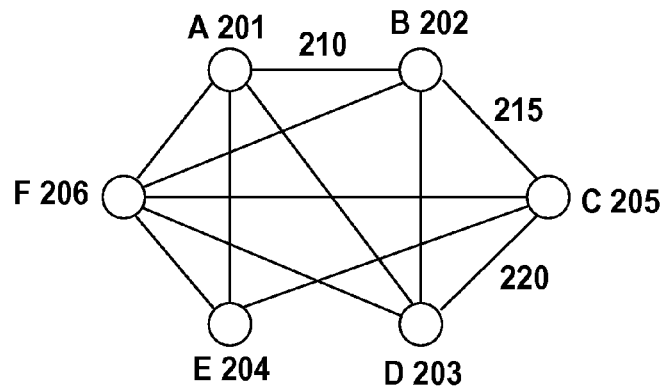
FIG. 2 is a schematic representation of the internal links connecting the various edge routers within a network.

Referring to FIG. 2, which illustrates a network 200 with, for example, six routers. Four routers within the network are edge routers: router A 201, router B 202, router D 203, and router E 204. All edge routers 201-204 are connected to the outside world. All links, such as link AB 210, link BC 215, and link CD 220, have the same capacity of 1 unit on both directions and all edge routers have the same admissible ingress and egress traffic constraints—that is, $\alpha_i = \beta_i = \gamma$, $1 \leq i \leq n$.

Using our techniques, we find the following:
1. $\gamma=2$, where $\gamma$ is the maximum amount of traffic that any edge router A 201, B 202, D 203, E 204 can inject into or receive from the network.
2. A set of paths from an edge router to another edge router. We can use (A, B) and (A, D) as an example. The rest of the paths can be deduced accordingly.
   (a) (A, B): two paths: A-B 210 and A-F-B. The load-balancing ratios are 0.5 and 0.5, respectively.
   (b) (A, D): A-D, A-F-D. Each path gets 0.5 of traffic from A to D.

Consider the traffic injected by all edge routers into the network. As long as the total amount of traffic injected by an edge router does not exceed 2 and as long as the edge routers will not receive more than 2 from all the routers, it can be verified that the traversing traffic on any internal link will never exceed 1 regardless of the distribution of the traffic between each edge router pair. This makes the FAC decision an easy task because we only need to check the ingress and the egress routers to see if adding a flow will violate the ingress and egress admissible constraints. For example, suppose we want to set up a new flow with rate=0.5 from A 201 to B 202. We first check if the current load of both A (201) and B (202) has exceeded 1.5. If not, the flow is accepted; otherwise the flow is rejected. It is not necessary to check the status of each link inside the network.

The techniques can also answer the reversed question, namely the internal link bandwidth that can make the network non-blocking for $\gamma=3$. The answer is 1.5, which is easily derived from the example by just scaling up the link capacity accordingly.

Figure 4:
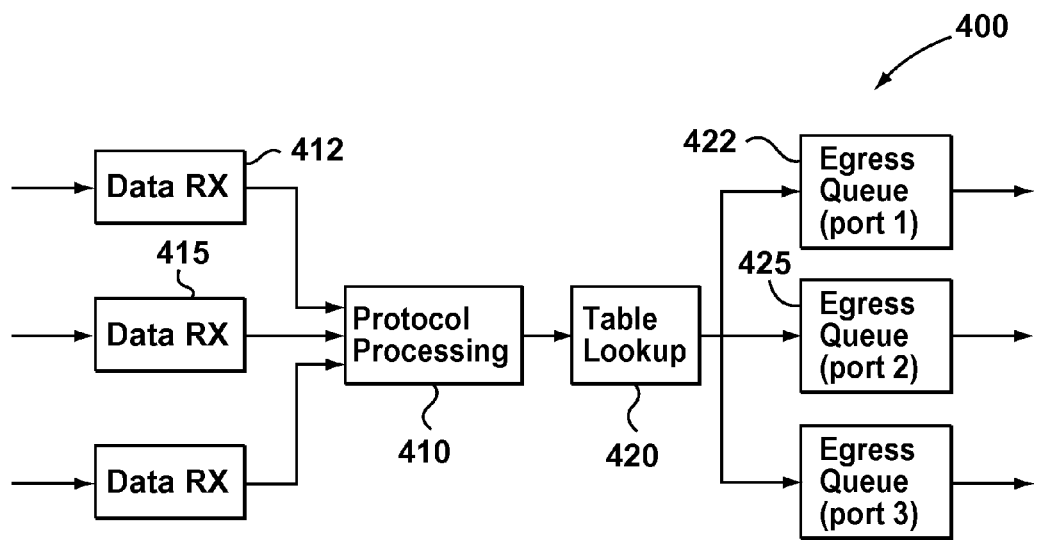
FIG. 4(a) is a schematic representation of a protocol processor.
FIG. 4(b) is a schematic representation of a sample balancing scheme.
Figure 4:
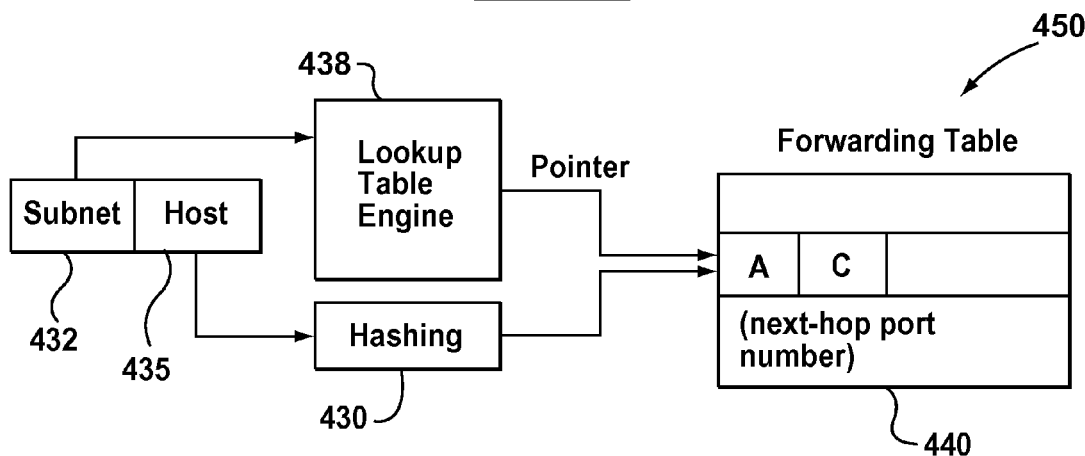

To implement the scheme, the lookup engine in a router needs to do load-distribution according to the computed load-balancing ratios. It also needs to do this without causing out-of-sequence transmissions. There are many ways to conduct load balancing. One example is shown in FIG. 4. FIG. 4(a) shows a standard protocol processor 400. It has a Protocol Processing unit 410, which are fed by data through Data RX 412, Data RX 415, etc. It also has Table Lookup unit 420, which feeds data into Egress Queue 422, Egress Queue 425, etc. FIG. 4(b) is a schematic representation of a load-balancing unit 450 with the Table Lookup Engine 438 conducting load balancing according to the computed load-balancing ratios. The hashing performed by Hashing unit 430 maps the host number field of the IP packet into a random number between [0, M]. Based on the result we select a path. For example, if the range is [0, 99] and there are three pre-determined paths with load-distribution ratios: 0.2, 0.4, and 0.4. If the output of the hashing unit 430 is between [0, 19], we use the first path. If it is in the range [20, 59], we use the second path; if in the range [60, 99], the third path. Alternatively, we can also use (destination host+TCP channel) as the input of the hashing unit. This can do load-balancing with a finer granularity.

Weight Setting Algorithms for Non-blocking Destination-Based Routing Networks

We assume the network has n edge routers and the ingress and egress bandwidth constraints of each router are given in the following H vectors $$H=[(\theta\tilde{\alpha}_1,\theta\tilde{\beta}_1),\ldots(\theta\tilde{\alpha}_n,\theta\tilde{\beta}_n)] \quad (1)$$

where $(\theta\tilde{\alpha}_i, \theta\tilde{\beta}_i)$ represent the maximum amount of ingress and egress traffic allowed to enter the network at the edge router i, where $\tilde{\alpha}_1$ and $\tilde{\beta}_1$ are constants describing the degree of unevenness of traffic patterns in the network and $\theta$ is a parameter to be maximized in our design. For example, suppose $(\tilde{\alpha}_1=5, \tilde{\beta}_1=5)$ and $(\tilde{\alpha}_2=15, \tilde{\beta}_2=15)$, then the traffic allowed at edge router 2 is three times that of router 1. Note that only the relative—not absolute—magnitudes of $\tilde{\alpha}_i$ and $\tilde{\beta}_i$ have significance as the real amount of admissible traffic is determined by $\theta$.

Compared with a conventional traffic matrix $T=\{d_{ij}\}$, where $d_{ij}$ represents the traffic rate from node i to node j, we must have $$\sum_j d_{ij} \leq \theta\tilde{\alpha}_i \text{ and } \sum_i d_{ij} \leq \theta\tilde{\beta}_j.$$

Traffic pattern of this kind was also called "hose model" pattern. For a given H, there are many traffic matrices T s that satisfy the constraints imposed by H. A traffic matrix $T=\{d_{ij}\}$ that does not violate the constraints imposed by H is called a valid traffic matrix. Let D be the set of all valid T s.

The network is described as a directed graph G(V,E) where V is the set of vertices (nodes) and E is the set of links. Let $Q \subset V$ be the set of edge routers through which traffic is admitted into the network.

Define:
 $C_e$: the capacity for link $e \in E$,
 $w_e$: the weight of link e, and $\{1, \ldots, K\}$ be the set of possible weights.
 $x_{ij}^e$: the portion of traffic from node $i \in Q$ to $j \in Q$ routed through link e.

Note that if link weights are given, routing (and $x_{ij}^e$) will be determined as long as we use the shortest path routing and even load-balancing among equal-distance paths.

The patent describes several methods to compute the routes and the maximum $\theta$ such that the backbone network is non-blocking. Define link congestion ratio as the ratio of the amount of traffic routed through a link over the link's capacity. The network congestion ratio r refers to the maximum value of all link congestion ratios. If r<1, the network has no congestion as traffic routed through any link is below the link capacity. We use the concept of minimizing congestion ratio to find the optimal weights. $\theta$ and r are related. To maximize $\theta$, we first assume the ingress and egress traffic constraints of node i are $(\tilde{\alpha}_i, \tilde{\beta}_i)$—instead of $(\theta\tilde{\alpha}_i, \theta\tilde{\beta}_i)$—and compute the network congestion ratio r. If we change the admissible amount at node i to $$\left(\frac{\tilde{\alpha}_i}{r}, \frac{\tilde{\beta}_i}{r}\right),$$

the new congestion ratio of the network is guaranteed to be $\leq 1$. Thus $$\left(\frac{\tilde{\alpha}_i}{r}, \frac{\tilde{\beta}_i}{r}\right)$$

will be the maximum admissible amount at edge router i. The problem of maximizing $\theta$ is now converted to the minimization of r as $\theta=1/r$.

To put it differently, consider the following: a network has five links, 11, 12, 13, 14, and 15. The capacity of each link is given below:
11, 12, 13: 10 Mbps
14, 15: 20 Mbps
Traffic routed through each link:
11: 15 Mbps, 12: 15 Mbps, 13: 10 Mbps
14: 40 Mbps, and 15: 10 Mbps
The congestion ratio of all links are: 11:1.5, 12:1.5, 13:1 14:2, 15:0.5

Accordingly, the network congestion ratio (the largest value among all) is 2.0, which means that if we lower the ingress and egress admissible traffic by a factor of 2.0, none of the links will experience congestion (all link congestion ratios will be $\leq 1.0$). As traffic is routed to minimize the congestion ratio of the network, the admissible amount of traffic is maximized. Note that the congestion ratio is not always to lower the admissible ingress and egress traffic; it can be used to increase the traffic.

Let o(e) and t(e) denote the originating and terminating nodes of link e. Let W(i,j) be the length of the shortest path from i to j. Let $\delta(e,j)$ be a set of binary variables such that $\delta(e,j)=1$ if link e is on a shortest path to node j, and 0 otherwise. Let $f_{ij}(v)$=(the portion of traffic from $i$ to $j$ that arrives at $v$)/$m$, where there are m shortest paths incident from v. In hop-by-hop routing, once link weights are determined, paths will be known and the amount of admissible QoS traffic can be computed accordingly. So the key question in maximizing QoS traffic of a DiffServ Internet will be the setting of link weights.

Method 1
We can use the following mixed-integer programming technique to find the optimal link weights that can minimize r, and consequently maximize $\theta$.

$$\min r \quad (2a)$$
subject to $$\sum_{e \in \Gamma^+(v)} x_{ij}^e - \sum_{e \in \Gamma^-(v)} x_{ij}^e = 0 \quad i, j \in Q, v \neq i, j \quad (2b)$$

$$\sum_{e \in \Gamma^+(v)} x_{ij}^e - \sum_{e \in \Gamma^-(v)} x_{ij}^e = 1 \quad i, j \in Q, v = i \quad (2c)$$

$$\sum_{e \in \Gamma^+(v)} x_{ij}^e - \sum_{e \in \Gamma^-(v)} x_{ij}^e = -1 \quad i, j \in Q, v = j \quad (2d)$$

$$\sum_{i \in Q} \tilde{\alpha}_i \cdot \pi_e(i) + \sum_{i \in Q} \tilde{\beta}_i \cdot \lambda_e(i) \leq c_e \cdot r \quad e \in E \quad (2e)$$

$$x_{ij}^e \leq \pi_e(i) + \lambda_e(j) \quad i, j \in Q, e \in E \quad (2f)$$

$$0 \leq f_{ij}(o(e)) - x_{ij}^e \leq 1 - \delta(e, j) \quad i, j \in Q, e \in E \quad (2g)$$

$$x_{ij}^e \leq \delta(e, j) \quad i, j \in Q, e \in E \quad (2h)$$

$$0 \leq W(t(e), j) + w_e - W(o(e), j) \leq (1 - \delta(e, j))M \quad j \in Q, e \in E \quad (2i)$$

$$1 - \delta(e, j) \leq W(t(e), j) + w_e - W(o(e), j) \quad j \in Q, e \in E \quad (2j)$$

$$0 \leq x_{ij}^e \leq 1 \quad i, j \in Q, e \in E \quad (2k)$$

$$\pi_e(i), \lambda_e(i) \geq 0 \quad i \in Q, e \in E \quad (2l)$$

$$f_{ij}(t) \geq 0 \quad i, j \in Q, t \in V \quad (2m)$$

$$W(t, j) \geq 0 \quad j \in Q, t \in V \quad (2n)$$

$$\delta(e, j) \in \{0, 1\} \quad j \in Q, e \in E \quad (2o)$$

$$1 \leq w_e \leq K \quad e \in E \quad (2p)$$

Constraints (2g) and (2h) are the flow splitting constraints such that traffic is split to the shortest paths according to the even distribution rule. Constraints (2i) and (2j) are the shortest path constraints. If link e does not lie on any shortest path to node j (i.e., $\delta(e,j)=0$), $W(t(e),j)+w_e-W(o(e),j)\geq 1$ must hold because $w_e \geq 1$. This is stated by (2j). On the other hand, constraint (2i) implies that $W(t(e),j)+w_e-W(o(e),j)=0$ if link e is on one of the shortest paths to node j. In addition, when $\delta(e,j)=0$, (2i) becomes redundant if M (an artificial constant) is sufficiently large.

Method 2
The above method is based on mixed-integer programming and its complexity is high. Another method is given below that takes a heuristic approach and has a much lower complexity. The algorithm uses iterative search and there are two stages in the search. At the first stage, we assume link weights are given. We find the worst-case traffic matrix T, in terms of congestion ratio minimization. At the second stage, the newly generated T will be used to search for a new set of link weights. The search will be guided by the minimization of an objective function that will play a critical role in the efficiency of the search algorithm.

Stage 1: The first stage is based on the fact that once link weights are known, routing $x_{ij}^e$ is determined. Then we can compute a new worst-case traffic matrix T that leads to the largest congestion ratio r by solving the following linear programming (LP) problem for each link.

$$\max \sum_{ij} x^e_{ij} d_{ij} \quad (3a)$$

subject to $$\sum_{j \in Q} d_{ij} \leq \tilde{\alpha}_i \quad i \in Q \quad (3b)$$

$$\sum_{i \in Q} d_{ij} \leq \tilde{\beta}_j \quad j \in Q \quad (3c)$$

$$d_{ij} \geq 0 \quad i, j \in Q \quad (3d)$$

where constraints (3b) and (3c) are the ingress and egress bandwidth constraints. We add the newly generated T to the set $\tilde{D}$ that stores the worst-case traffic matrices Ts computed from the previous steps. The worst-case traffic matrices in $\tilde{D}$ will serve as the representative traffic matrices in our search for the optimal link weights at the second stage.

Stage 2: We now have a new set $\tilde{D}$ which will be used as the representative traffic matrices in the search of new link weights. We use simulated annealing, a typical local search method, to find a new set of link weights that can achieve a lower objective function. Our objective is to minimize congestion ratio r. But r cannot be directly used as the objective function for the local search. Note that given a routing, we can compute the maximum link utilization for traffic matrix T, which is denoted as $r_T$. Obviously the network congestion ratio $r=\max\{r_T\}$, for all $T \in \tilde{D}$. Changing link weights can reduce a particular $r_T$, but may increase another $r_T$. Thus, the network congestion ratio r may not be improved, and this makes r a poor objective function for the search.

Therefore, the objective function should include $r_T$ for all traffic matrices in $\tilde{D}$. We use the following objective function to guide our search.

$$F(\tilde{D})|_{for\ given\ weights} = \sum_{T \in \tilde{D}} \phi(r_T) \quad (4)$$

where $\phi(r_T)$ is the cost function for $r_T$ and is defined as a convex piece-wise linear cost function given below:

$$\phi(r_T) = \begin{cases} r_T & 0 \leq r_T < \frac{1}{3} \\ 3r_T - \frac{2}{3} & \frac{1}{3} \leq r_T < \frac{2}{3} \\ 10r_T - \frac{16}{3} & \frac{2}{3} \leq r_T < \frac{9}{10} \\ 70r_T - \frac{178}{3} & \frac{9}{10} \leq r_T < 1 \\ 500r_T - \frac{1468}{3} & 1 \leq r_T < \frac{11}{10} \\ 5000r_T - \frac{16318}{3} & \frac{11}{10} \leq r_T < \infty \end{cases} \quad (5)$$

Eq. (5) implies that cost $\phi(r_T)$ grows drastically as $r_T$ increases. Note that to our search problem, the exact definition of the cost function is not so important as its convexity.

At the end of stage 2, based on the newly obtained weights, we re-compute the congestion ratio r for the hose-model vector H. The program terminates if the new congestion ratio differs from the old one by an amount smaller than a predefined ε. The framework of the heuristic algorithm is presented in CHART 1.

CHART 1

Framework of the Heuristic Algorithm

Step 0. Initialization.
    Initialize a weight setting w, setting $w_e = 1$, for $e \in E$. Compute the traffic distribution $x^e_{ij}$, based on the weight setting w. Solve Eq. (3) to determine the congestion ratio r. Set the set of traffic matrices $\tilde{D} = \emptyset$. Set optimal weight setting as $w^* = w$.
Step 1. Determine the set of traffic matrices.
    For each link, determine the traffic matrix T that achieves the congestion ratio r. If $T \notin \tilde{D}$, put T into $\tilde{D}$.
Step 2. Search the optimal weight setting for the set of traffic matrices in $\tilde{D}$
    Use local search algorithms (such as simulated annealing) to find the optimal weight setting for the set of traffic matrices in $\tilde{D}$. The best weight setting obtained is denoted as $w_{best}$.
Step 3. Determine the new congestion ratio r for weight setting $w_{best}$.
    If r differs from the old one by an amount smaller than a defined ε, set $w^* = w_{best}$ and terminate. Otherwise, return to Step 1.

The key issue of the proposed heuristic algorithm is to search the optimal link weight for a given set of traffic matrices at the second stage. In our work, we use simulated annealing method to achieve this goal. Important issues of the method include the space for which the search is to be carried out and an effective neighborhood structure. In our algorithm, the search space is the link weight space which is defined by $w_e \in \{1, 2, \ldots, K\}$ for all $e \in E$. We use a neighborhood structure that is based on modifying the link weight of one single link. Note that randomly changing a link weight value does not always result in a different set of shortest paths (and, thereby, a different traffic distribution). We develop a neighborhood structure where a neighbor of the current weight always implies a different traffic distribution. Suppose link e is selected and its current weight is $w_e$. We randomly select a source-destination pair (i,j). Then based on the load distribution variable $x_{ij}^e$ (i.e., $x_{ij}^e=0$, $0<x_{ij}^e<1$, or $x_{ij}^e=1$), we can easily compute the minimum amount that $w_e$ needs to be changed to obtain a different load distribution $x_{ij}^e$.

At each step, the algorithm randomly selects a link and modifies the link weight (increase or decrease randomly) to obtain a new routing and a new traffic distribution. The objective function is calculated according to the new traffic distribution and compared to the old one. The algorithm then uses the simulated annealing scheme to decide if the new weight setting will be accepted or not. Since the initial link weights play an important role in the effectiveness of the method, we randomly sample 10 independent initial weighs and pass them to the simulated annealing algorithm at the second stage.

Figure 5:
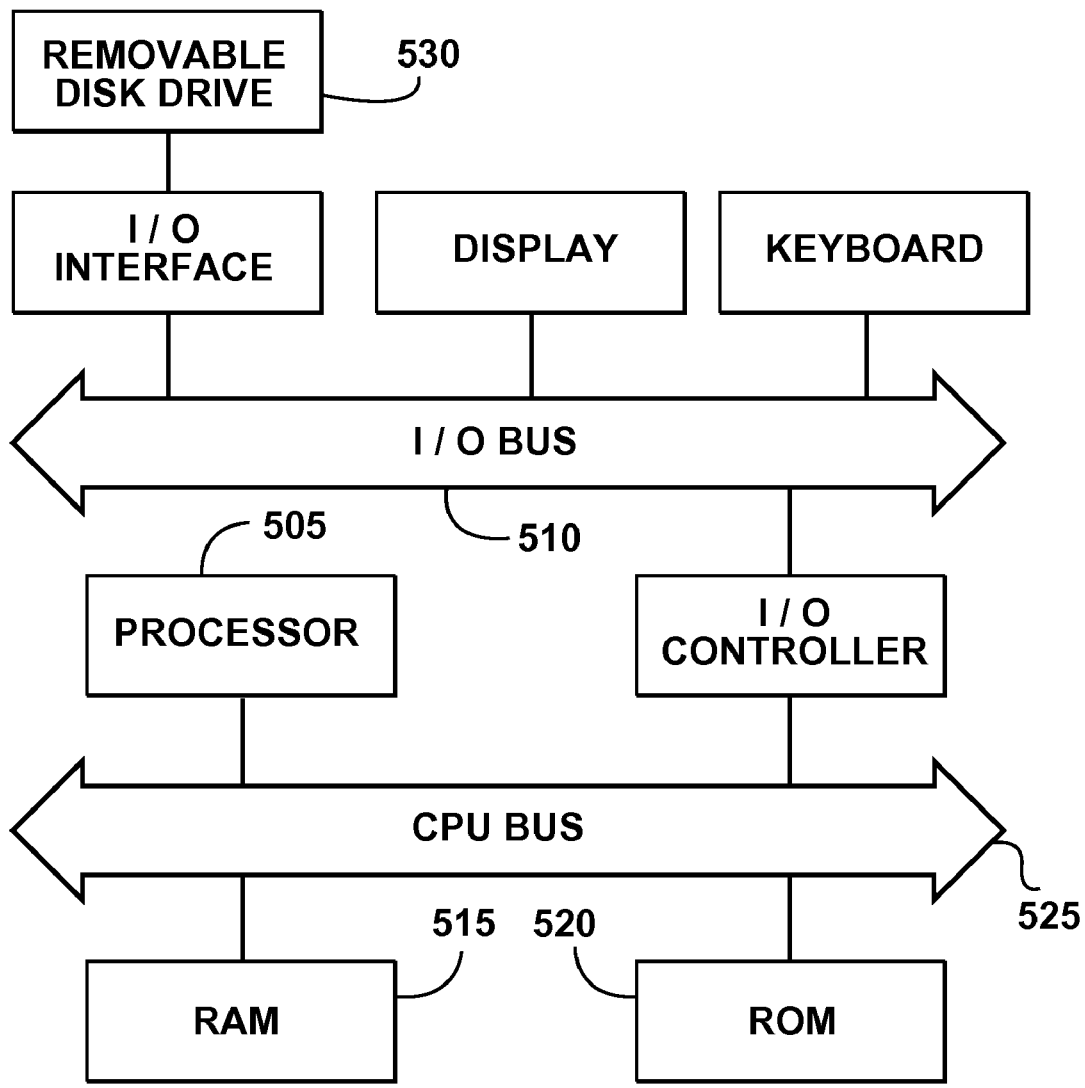
FIG. 5 is a typical hardware system which can be used to implement the method of this invention.

The foregoing description of the invention has been presented for purposes of illustration and description. It is not intended to be exhaustive or to limit the invention to the precise embodiments disclosed. The invention, for example, can be implemented in a computing system of FIG. 5 including a processor 505, an I/O bus 510, system memories 515 and 520, a CPU bus 525, and interface slots to connect to a variety of I/O devices, including storage devices, such as a removal disk drive 530. The processor represents a central processing unit of any type of architecture, such as complex instruction set computers (CISC), reduced instruction set computers (RISC), very long instruction word (VLIW), or hybrid architecture. The invention could be implemented in a multi-processor or single processor computer system. The system memories may include flash memory, read only memory (ROM) 520, or random access memory (RAM) 515. The system memories may include a program and/or data. The program may contain traffic management programs such as hop-by-hop selector. The data may contain databases such as resource bandwidth constraint, link weights, other routing protocol databases, and the like.

When implemented in software, the elements of the present invention are essentially the code segments to perform the necessary tasks. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Those skilled in the art will readily observe that numerous modifications and alterations of the device may be made without departing from the scope, spirit or teachings of the invention. The invention is defined by the following claims and their equivalents.

We claim:

1. A method of routing data through a network having a plurality of nodes interconnected by a plurality of links in a hop-by-hop network using a shortest-path routing protocol, the network connected to one or more other networks by edge nodes, comprising:

a device for:
computing an admissible ingress traffic for an ingress node;
computing an admissible egress traffic for an egress node;
computing and optimizing a set of link weights;
determining equal-distance routes between the ingress node and the egress node in the network according to the optimized set of link weights;
computing a network congestion ratio according to a minimum value r, r being subjected to $$\sum_{e \in \Gamma^+(v)} x_{ij}^e - \sum_{e \in \Gamma^-(v)} x_{ij}^e = 0 \quad i, j \in Q, v \neq i, j$$

$$\sum_{e \in \Gamma^+(v)} x_{ij}^e - \sum_{e \in \Gamma^-(v)} x_{ij}^e = 1 \quad i, j \in Q, v = i$$

$$\sum_{e \in \Gamma^+(v)} x_{ij}^e - \sum_{e \in \Gamma^-(v)} x_{ij}^e = -1 \quad i, j \in Q, v = j$$

$$\sum_{i \in Q} \tilde{\alpha}_i \cdot \pi_e(i) + \sum_{i \in Q} \tilde{\beta}_i \cdot \lambda_e(i) \leq c_e \cdot r \quad e \in E$$

$$x_{ij}^e \leq \pi_e(i) + \lambda_e(j) \quad i, j \in Q, e \in E$$

$$0 \leq f_{ij}(o(e)) - x_{ij}^e \leq 1 - \delta(e, j) \quad i, j \in Q, e \in E$$

$$x_{ij}^e \leq \delta(e, j) \quad i, j \in Q, e \in E$$

$$0 \leq W(t(e), j) + w_e - W(o(e), j) \leq (1 - \delta(e, j))M \quad j \in Q, e \in E$$

$$1 - \delta(e, j) \leq W(t(e), j) + w_e - W(o(e), j) \quad j \in Q, e \in E$$

$$0 \leq x_{ij}^e \leq 1 \quad i, j \in Q, e \in E$$

$$\pi_e(i), \lambda_e(i) \geq 0 \quad i \in Q, e \in E$$

-continued $$f_{ij}(t) \geq 0 \quad i, j \in Q, t \in V$$

$$W(t, j) \geq 0 \quad j \in Q, t \in V$$

$$\delta(e, j) \in \{0, 1\} \quad j \in Q, e \in E$$

$$1 \leq w_e \leq K \quad e \in E$$

where the network being described by graph G(V,E), G representing nodes, E representing the set of links, Q⊂V being the set of edge routers through which traffic is admitted into the network, $(\theta\tilde{\alpha}_i, \theta\tilde{\beta}_i)$ representing the admissible ingress and egress traffic allowed to enter the network at the edge router i and where $\tilde{\alpha}_i$ and $\tilde{\beta}_i$ comprising constants describing a degree of unevenness of traffic patterns, $c_e$ being the capacity for link e∈E, $w_e$ being the weight of link e, $\{1, \ldots, K\}$ be the set of possible weights, $x_{ij}^e$ representing a portion of traffic from node i∈Q to j∈Q routed through link e in even load-balancing framework; and adjusting the admissible ingress traffic and the admissible egress traffic by the network congestion ratio so that a flow can be admitted to the network if the adjusted admissible ingress traffic and the adjusted admissible egress traffic are not exceeded.

2. The method of claim 1, further comprising blocking a flow setup packet from entering the ingress node when a threshold value is exceeded.

3. The method of claim 2, further comprising rejecting a flow-setup acknowledgement from entering the ingress node.

4. The method of claim 1, further comprising blocking a flow setup packet from leaving the egress node when the threshold value is exceeded.

5. The method of claim 4, further comprising disallowing a flow-setup acknowledgement packet from leaving the egress node.

6. A router for routing data from an ingress node to an egress node, the ingress node and the egress node included in a network of nodes interconnected by links, the router comprising a processing module for:

a device for:
computing an admissible ingress traffic for the ingress node;
computing an admissible egress traffic for the egress node;
computing and optimizing a set of link weights;
determining equal-distance routes between the ingress node and the egress node in the network according to the optimized set of link weights;
computing a network congestion ratio according to a minimum value r, r being subjected to

| | |
|---|---|
| $\sum_{e \in \Gamma^+(v)} x_{ij}^e - \sum_{e \in \Gamma^-(v)} x_{ij}^e = 0$ | $i, j \in Q, v \neq i, j$ |
| $\sum_{e \in \Gamma^+(v)} x_{ij}^e - \sum_{e \in \Gamma^-(v)} x_{ij}^e = 1$ | $i, j \in Q, v = i$ |
| $\sum_{e \in \Gamma^+(v)} x_{ij}^e - \sum_{e \in \Gamma^-(v)} x_{ij}^e = -1$ | $i, j \in Q, v = j$ |
| $\sum_{i \in Q} \tilde{\alpha}_i \cdot \pi_e(i) + \sum_{i \in Q} \tilde{\beta}_i \cdot \lambda_e(i) \leq c_e \cdot r$ | $e \in E$ |

-continued

| | |
|---|---|
| $x_{ij}^e \leq \pi_e(i) + \lambda_e(j)$ | $i, j \in Q, e \in E$ |
| $0 \leq f_{ij}(o(e)) - x_{ij}^e \leq 1 - \delta(e, j)$ | $i, j \in Q, e \in E$ |
| $x_{ij}^e \leq \delta(e, j)$ | $i, j \in Q, e \in E$ |
| $0 \leq W(t(e), j) + w_e - W(o(e), j) \leq (1 - \delta(e, j))M$ | $j \in Q, e \in E$ |
| $1 - \delta(e, j) \leq W(t(e), j) + w_e - W(o(e), j)$ | $j \in Q, e \in E$ |
| $0 \leq x_{ij}^e \leq 1$ | $i, j \in Q, e \in E$ |
| $\pi_e(i), \lambda_e(i) \geq 0$ | $i \in Q, e \in E$ |
| $f_{ij}(t) \geq 0$ | $i, j \in Q, t \in V$ |
| $W(t, j) \geq 0$ | $j \in Q, t \in V$ |
| $\delta(e, j) \in \{0, 1\}$ | $j \in Q, e \in E$ |
| $1 \leq w_e \leq K$ | $e \in E$ | where the network being described by graph G(V,E), G representing nodes, E representing the set of links, Q ⊂ V being the set of edge routers through which traffic is admitted into the network, $(\theta\tilde{\alpha}_i, \theta\tilde{\beta}_i)$ representing the admissible ingress and egress traffic allowed to enter the network at the edge router i and where $\tilde{\alpha}_i$ and $\tilde{\beta}_i$ comprising constants describing a degree of unevenness of traffic patterns, $c_e$ being the capacity for link e∈E, $w_e$ being the weight of link e, $\{1, \ldots, K\}$ be the set of possible weights, $x_{ij}^e$ representing a portion of traffic from node i∈Q to j∈Q routed through link e in even load-balancing framework; and adjusting the admissible ingress traffic and the admissible egress traffic by the network congestion ratio so that a flow can be admitted to the network if the adjusted admissible ingress traffic and the adjusted admissible egress traffic are not exceeded.

7. A method of routing data through a network having a plurality of nodes interconnected by a plurality of links in a hop-by-hop network using a shortest-path routing protocol, the network connected to one or more other networks by edge nodes, comprising:
a device for:
computing an admissible ingress traffic for an ingress node;
computing an admissible egress traffic for an egress node;
computing and optimizing a set of link weights;
determining equal-distance routes between the ingress node and the egress node in the network according to the optimized set of link weights;
computing a network congestion ratio by computing a minimum value r using a heuristic approach comprising solving a worst traffic matrix by a linear programming function wherein the linear programming function comprises:

$$\max \sum_{ij} x_{ij}^e d_{ij}$$

subject to $$\sum_{j \in Q} d_{ij} \leq \tilde{\alpha}_i \quad i \in Q$$

$$\sum_{i \in Q} d_{ij} \leq \tilde{\beta}_j \quad j \in Q$$

$$d_{ij} \geq 0 \quad i, j \in Q$$

where the network being described by graph G(V,E), G representing nodes, E representing the set of links, Q ⊂ V being the set of edge routers through which traffic is admitted into the network, $(\theta\tilde{\alpha}_i, \theta\tilde{\beta}_i)$ representing the admissible ingress and egress traffic allowed to enter the network at the edge router i and where $\tilde{\alpha}_i$ and $\tilde{\beta}_i$ comprising constants describing a degree of unevenness of traffic patterns, $d_{ij}$ representing the traffic rate from node i to node j, and $x_{ij}^e$ representing a portion of traffic from node i∈Q to j∈Q routed through link e; and adjusting the admissible ingress traffic and the admissible egress traffic by the network congestion ratio so that a flow can be admitted to the network if the adjusted admissible ingress traffic and the adjusted admissible egress traffic are not exceeded.

* * * * *